(No Model.)
A. C. REX.
EGG AND CAKE BEATER.
No. 298,503. Patented May 13, 1884.
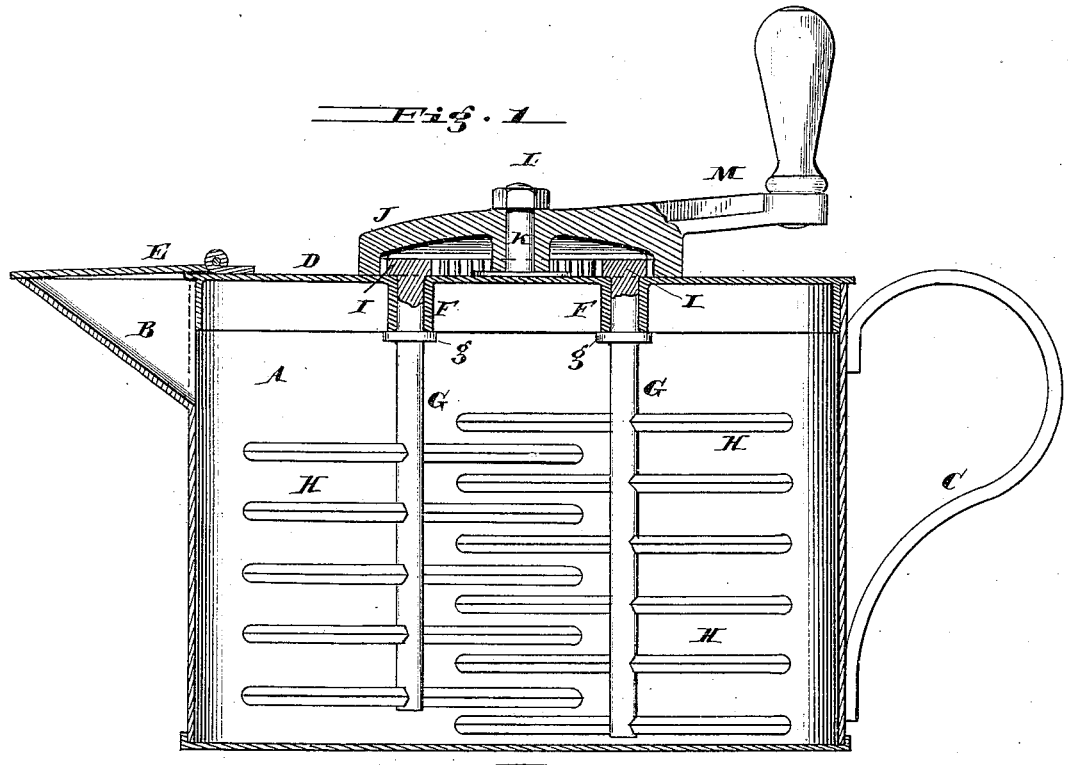
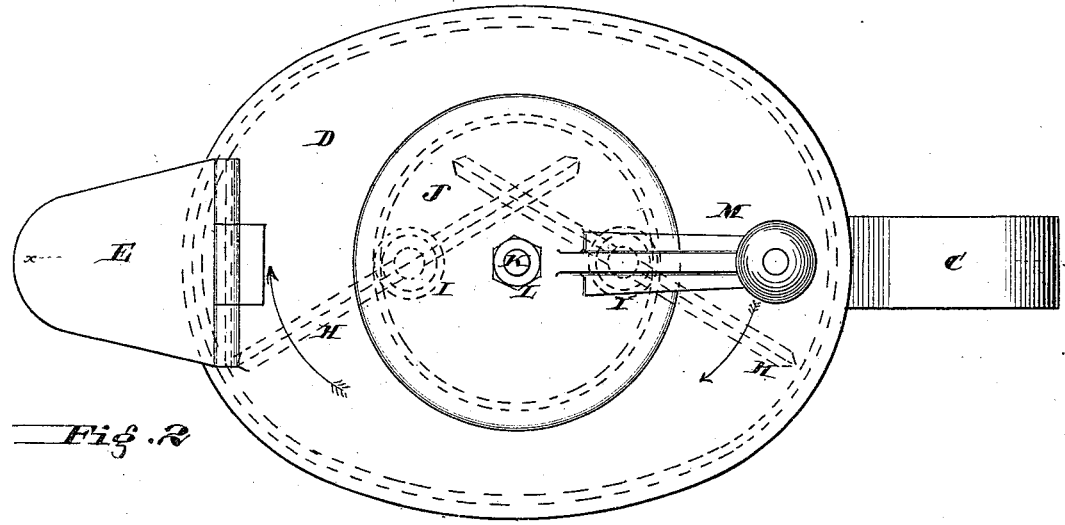
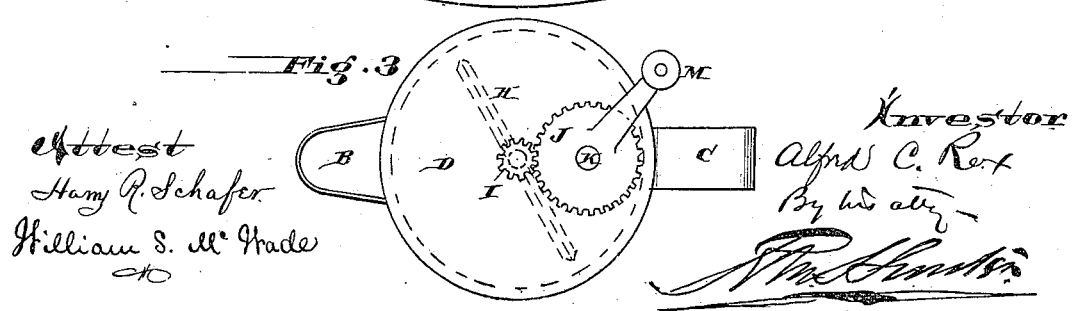

UNITED STATES PATENT OFFICE.

ALFRED C. REX, OF PHILADELPHIA, PENNSYLVANIA.

EGG AND CAKE BEATER.

SPECIFICATION forming part of Letters Patent No. 298,503, dated May 13, 1884.

Application filed December 6, 1883. (No model.)

*To all whom it may concern:*

Be it known that I, ALFRED C. REX, of the city of Philadelphia, county of Philadelphia and State of Pennsylvania, have invented an Improvement in Egg and Cake Beaters, of which the following is a specification.

My invention has reference to egg and cake beaters; and it consists in a tin can or box provided with a cover, the latter being provided with bearings, and combined with one or more beaters having radiating arms and arranged to be rotated by gear mechanism, the said beater-arms being arranged to fit into the can or box, and in details of construction, all of which is fully set forth in the following specification, and shown in the accompanying drawings, which form part thereof.

The object of my invention is to form an egg or cake beater adapted to contain the material to be beaten in an inclosed case or receptacle, and cause the beaters to traverse all of said material without being shifted from one place therein to another.

In the drawings, Figure 1 is a sectional elevation of my improved egg and cake beater on line $x\ x$ of Fig. 2. Fig. 2 is a plan view of same, and Fig. 3 is a plan view of a modified form of same.

A is the tin can or box, and where two beaters are used it is preferably made elliptical or oval, as shown in Fig. 2; but where only one beater is used it is preferably made circular. B is the spout and C is the handle. D is the cover, and may be provided with a hinged piece or flap, E, to close the mouth or spout B, to prevent the eggs or other material from splashing out. F are bearings on said cover, and have journaled therein the beater-shafts G, having arms H upon their free ends. When two beaters are used, then the arms H of one pass between the arms H of the other, as shown in Fig. 1; and these beaters are preferably made to rotate in the same direction, so that their adjacent arms shall pass in opposite directions. The shafts G of the beaters are held in the bearings F by collars $g$ on the bottom, and pinions I on the top, and these pinions mesh with a spur-wheel, J, journaled on a stud, K, and retained thereon by a screw, L, and provided with a handle, M. When two beaters are used, it is preferable to make this spur-wheel J with internal teeth, to increase its diameter and keep it clean, and when dirty the screw L is removed and the box-wheel J taken off, and it and the pinions I cleaned.

I do not limit myself to the exact construction shown, as my invention may be modified in various ways without departing from my invention. For instance, the two pinions I I may be geared together and one rotated by hand, or the beater arms H may be differently shaped.

Having now described my invention, what I claim as new, and desire to secure by Letters Patent, is—

1. A cake or egg beater consisting of a closed vessel combined with rotary beaters having vertical shafts and radiating arms, the arms of one beater passing between the arms of the other during their rotation, said beaters being located and journaled therein, and gear mechanism to rotate said beaters, substantially as and for the purpose specified.

2. The combination of vessel A, removable cover D, and rotary beaters G H, journaled in said cover, substantially as and for the purpose specified.

3. The combination of vessel A, having a spout, removable cover D, having a flap, E, to cover said spout, and rotary beaters G H, journaled in said cover, substantially as and for the purpose specified.

4. The combination of vessel A, removable cover D, and beaters G H, journaled in said cover, pinion I, box spur-wheel J, having internal teeth, and a crank, M, substantially as and for the purpose specified.

In testimony of which invention I hereunto set my hand.

ALFRED C. REX.

Witnesses:
WILLIAM McWADE,
FRANCIS S. BROWN.